(12) United States Patent
Tellenbach et al.

(10) Patent No.: US 7,497,137 B2
(45) Date of Patent: Mar. 3, 2009

(54) METHOD OF MONITORING AND/OR DETERMINING THE CONDITION OF A FORCE-MEASURING DEVICE, AND FORCE-MEASURING DEVICE

(75) Inventors: Jean-Maurice Tellenbach, Hettlingen (CH); Daniel Aepli, Dübendorf (CH); Helmut Bäumel, Greifensee (CH)

(73) Assignee: Mettler-Toledo AG, Greifensee (CH)

( * ) Notice: Subject to any disclaimer, the term of this patent is extended or adjusted under 35 U.S.C. 154(b) by 182 days.

(21) Appl. No.: 11/559,526

(22) Filed: Nov. 14, 2006

(65) Prior Publication Data

US 2007/0119226 A1 May 31, 2007

(30) Foreign Application Priority Data

Nov. 15, 2005 (EP) .................. 05110766

(51) Int. Cl.
*G01G 23/01* (2006.01)
(52) U.S. Cl. .............. 73/865.9; 177/1; 177/50; 702/34; 702/116
(58) Field of Classification Search ............... 73/865.9; 702/34, 116, 173, 174; 177/1, 50
See application file for complete search history.

(56) References Cited

U.S. PATENT DOCUMENTS

| | | | | | |
|---|---|---|---|---|---|
| 3,211,245 | A | * | 10/1965 | Loshbough | 177/3 |
| 4,487,280 | A | * | 12/1984 | Knothe et al. | 177/212 |
| 4,656,599 | A | * | 4/1987 | Knothe et al. | 702/173 |
| 4,798,252 | A | * | 1/1989 | Knothe et al. | 177/245 |
| 4,802,541 | A | * | 2/1989 | Bator et al. | 177/212 |
| 4,804,053 | A | * | 2/1989 | Nordstrom | 177/211 |
| 4,846,293 | A | * | 7/1989 | Li | 177/210 C |
| 4,858,145 | A | * | 8/1989 | Inoue et al. | 702/41 |
| 4,890,246 | A | * | 12/1989 | Oldendorf et al. | 702/101 |
| 5,050,693 | A | * | 9/1991 | Wirth et al. | 177/200 |
| 5,232,063 | A | * | 8/1993 | Stoller | 177/210 FP |
| 5,646,376 | A | * | 7/1997 | Kroll et al. | 177/211 |
| 5,952,587 | A | | 9/1999 | Rhodes et al. | |
| 6,278,952 | B1 | * | 8/2001 | Swain | 702/64 |
| 6,923,449 | B2 | | 8/2005 | Burkhard et al. | |
| 6,956,175 | B1 | * | 10/2005 | Daly et al. | 177/1 |
| 7,020,577 | B2 | * | 3/2006 | Wilby | 702/173 |
| 7,051,603 | B2 | | 5/2006 | Loher et al. | |

(Continued)

FOREIGN PATENT DOCUMENTS

EP        0737851 B1    10/1996

(Continued)

*Primary Examiner*—David A. Rogers
(74) *Attorney, Agent, or Firm*—Standley Law Group LLP

(57) ABSTRACT

In a method for monitoring and/or determining the condition of a force-measuring device with at least one housing that has an interior space and with at least one force-measuring cell installed in the interior space of the at least one housing, at least one parameter of the atmospheric climate of the interior space is measured with at least one sensor that is arranged in the interior space of the housing or with at least one sensor that is arranged at the housing, wherein said parameter is of a kind that has an influence on the operating lifetime of the force-measuring cell; and a sensor signal corresponding to the measured parameter of the atmospheric climate of the interior space is transmitted to a computing unit and/or to a data output device.

20 Claims, 5 Drawing Sheets

U.S. PATENT DOCUMENTS

| | | |
|---|---|---|
| 7,145,086 B2 * | 12/2006 | Iiduka et al. ................ 177/180 |
| 7,323,645 B2 * | 1/2008 | Nufer et al. ................. 177/180 |
| 2004/0124017 A1 * | 7/2004 | Jones et al. ................. 177/144 |
| 2004/0245026 A1 * | 12/2004 | Brighenti ................. 177/25.14 |
| 2005/0072605 A1 * | 4/2005 | Kunzi et al. ................ 177/126 |
| 2005/0081650 A1 | 4/2005 | Bucher et al. |
| 2005/0125105 A1 * | 6/2005 | Halstead et al. ............ 700/299 |
| 2006/0021803 A1 * | 2/2006 | Iiduka et al. ................ 177/180 |
| 2006/0064264 A1 * | 3/2006 | Pottebaum et al. .......... 702/101 |
| 2007/0151771 A1 * | 7/2007 | Brighenti ................ 177/25.13 |

FOREIGN PATENT DOCUMENTS

| | | |
|---|---|---|
| JP | 63145922 A * | 6/1988 |
| WO | 2004/104567 A1 | 12/2004 |

\* cited by examiner

METHOD OF MONITORING AND/OR DETERMINING THE CONDITION OF A FORCE-MEASURING DEVICE, AND FORCE-MEASURING DEVICE

CROSS-REFERENCE TO RELATED APPLICATIONS

This application claims a right of priority under 35 USC §119 from European patent application 05 110 766.2, filed 15 Nov. 2005, the content of which is incorporated by reference as if fully recited herein.

TECHNICAL FIELD

The embodiments disclosed herein relate to a method of monitoring and/or determining the condition of a force-measuring device with at least one housing having an interior space and with at least one force-measuring cell installed in the interior space of the at least one housing, and it also relates to a force-measuring device that is suitable for carrying out the method.

BACKGROUND OF THE ART

Many force-measuring devices, in particular gravimetric measuring instruments such as for example balances, thermogravimetric instruments, instruments for the gravimetric determination of moisture content, weighing modules for tank installations and reactor containers, weighing modules and multiple weighing devices in filling and packaging systems, as well as measuring devices for torque and acceleration are protected by effective measures against destruction in view of their sometimes very aggressive work environment. These protective measures consist of housings which are adapted to the work environment and which have to meet specific regulatory requirements in regard to the penetration of dust, moisture and the like, of the kind that are defined for different protection classes for example in the norm document EN60529, Ingress Protection Ratings.

High-capacity force-measuring cells for weighing modules, so-called tank- or reactor-container weighing modules are for example enclosed in stainless steel housings that are welded gas-tight. The force-measuring cells encased in such housings work problem-free as long as the environmental factors which influence the weighing signal are kept away from the force-measuring cell by the housing. Also, in most cases, the force measuring cells are not instantaneously destroyed in the case of housing leaks, but the destruction occurs more as a gradual process which is often discovered only at a late stage. If the measuring device is built into an industrial installation with a high degree of automation, a defect in the measuring device can often lead to a long downtime of the system or to defective products.

Depending on the conditions of the ambient environment, it is not absolutely necessary for the force-measuring devices to be hermetically encapsulated. Housings of a simpler and more cost-effective kind with contact-free passage openings as disclosed for example in U.S. Pat. No. 6,923,449 B2 can also be used in an industrial environment. Conventional balance housings, too, can meet their purpose adequately under suitable ambient conditions. Still, with an error in manipulation it is possible that for example a liquid penetrates into the interior of the housing and increases the relative humidity of the housing interior to such a degree that parts of the force-measuring cell or the electronic components of the signal-processing circuitry become corroded.

Force-measuring devices are often transported over long distances and kept in storage before they are put into operation. With exposure to unsuitable environments during transportation and storage, it is possible that condensation occurs inside the housing, which can severely compromise the measurement performance.

Depending on the housing enclosure, an inspection of the force-measuring cell is very expensive or even impossible. A periodic checking of the force-measuring devices used in systems installations is complicated and expensive.

A force-measuring cell which is disclosed in U.S. Pat. No. 7,051,603 B1 is in addition equipped with a temperature sensor. The analog signals of the force-measuring cell are converted by means of a first converter circuit, and the analog signals delivered by the temperature sensor are converted by a second converter circuit into bi-level pulsewidth-modulated signals. These signals are transferred by way of connecting leads to a processor module, where they are further processed by means of compensation data which are recalled from a memory storage module. The processing of the force-measuring cell signals with the temperature sensor signals serves to correct the temperature-related drift of the weighing cell. While this kind of treatment of the weighing signal can adequately compensate for the effects of the ambient environment on the weighing result, it cannot provide a determination of the actual condition of the force-measuring cell.

The present objective, therefore, is to provide a method for the monitoring and/or determination of the condition of a force-measuring cell arranged inside a housing without the need to open the housing in order to determine the condition of the force-measuring cell.

SUMMARY OF THE INVENTION

This objective is met with a method and a force-measuring device with the features specified in the appended claims.

In a method for monitoring and/or determining the condition of a force-measuring device with at least one housing that has an interior space and with at least one force-measuring cell installed in the interior space of the at least one housing, at least one sensor is arranged in the interior space of the housing or at least one sensor is arranged at the housing for measuring at least one parameter of the atmospheric climate of the interior space, which has an influence on the operating lifetime of the force-measuring cell, and a sensor signal corresponding to the measured parameter of the atmospheric climate of the interior space is transmitted to a computing unit and/or a data output device.

If the parameter of the atmospheric climate of the interior space also has an influence on the weighing signal of the force-measuring device, a sensor signal corresponding to the measured parameter of the atmospheric climate of the interior space can be transmitted by the at least one sensor or by an additional sensor to the computing unit and can be compared in the computing unit with an upper operating limit value and/or a lower operating limit value. If the sensor signal is found to be outside one of these operating limit values, the sensor signal or an output signal of the computing unit is transmitted to a data output device.

Of course, a sensor signal of a parameter of the atmospheric climate of the interior space which has an influence on the operating lifetime of the force-measuring cell and/or on the weighing signal can also be determined continuously or periodically and/or randomly by the at least one sensor.

A continuous determination of the sensor signals has the advantage that the entire time profile of the sensor signal is available which provides information about the magnitude and duration of the exposure of the force-measuring cell to the respective parameter of the atmospheric climate of the interior space, which allows the time profile to be used for the calculation of the remaining operating lifetime.

The attribute "random" in this context means that the determining or generating of a signal is not triggered according to a fixed time pattern, but is initialized for example by a random event generator or by the user. This initialization can cause the acquisition of an individual signal, or it can also trigger a periodic signal acquisition over a predetermined amount of time.

Preferably, the at least one sensor functions to detect the change of at least one parameter of the atmospheric climate of the interior space which has an influence on the operating lifetime of the force-measuring cell and/or on the weighing signal, and to determine a sensor signal corresponding to this change. This sensor signal can be transmitted automatically to the data output device or computing unit.

The term "computing unit" in this context is meant to encompass all signal-processing elements such as analog circuits, digital circuits, integrated circuits, processors, computers and the like, by which the sensor signals generated by the sensor are compared to values that have already been stored or set in the computing unit. These values, in particular maximum values, threshold values and operating limit values can be taken from regulatory standards such as national or international norms, or they can be determined from comparative measurements, or they can have been set by the manufacturer of the force-measuring device.

Maximum values and threshold values are in most cases dependent on the design of the force-measuring device and are as a rule set by the manufacturer, but it is also possible that they are set by the user. Threshold values define limit values relating to the condition of the device which cannot be exceeded without causing permanent damage to the weighing cell, where however such permanent damage does not make the force-measuring device principally unusable. By a recalibration of the force-measuring device after the threshold value has been exceeded, it is possible to compensate for the change. If the threshold value is exceeded repeatedly, this can cause a progressive destruction of the force-measuring device until a condition is reached which can no longer be compensated by a recalibration. This condition is expressed and represented by the maximum value. Of course, a maximum value can also be reached by a one-time event, if the values of the atmospheric climate in the interior space change very strongly or if other factors such as for example hard shocks to the force-measuring device lead to the destruction of the latter.

These values can be stored in appropriate form in the computing unit. If needed, the force-measuring device can also include a plurality of computing units, for example each of the installed sensors can have its own computing unit. The operating limit values can be set for example in accordance with OIML R60 (International Organization of Legal Metrology, Recommendation #60), as follows:

| Air pressure limits: | +95 kPa to +105 kPa |
| --- | --- |
| Temperature limits for Class II: | +10° C. to +30° C. |
| Temperature limits for Class III: | −10° C. to +40° C. |

The operating limit values define the range of values for the atmospheric climate of the interior space, in which the force-measuring cell can be operated without exceeding the permissible measuring result tolerances of the force-measuring device.

The term "data output device" means all transmitting, indicating and warning systems working either in an analog or digital way which are suitable so that the sensor signals generated by the sensor for a parameter of the atmospheric climate of the interior space or for representing an output signal of the computing unit can be represented through appropriate means such as sound, light, vibrations, electrical signals, electromagnetic pulses, numeric indications and the like, or that they can be transmitted to other instruments, for example other data output devices, control systems, terminals and the like. Therefore, the data output device can also be a transponder or transmitter which sends the sensor signals and/or output signals for example to a portable instrument. By means of the data output device, a warning can be given to the user, the result can be forwarded to a storage unit, or it is even possible to directly alert the manufacturer or its service organization for example through internet connections.

All sensors can be active systems which detect a change automatically and send a sensor signal to the computing unit and/or the data output device. But passive sensors, too, can be used which are periodically interrogated by the computing unit to obtain the sensor signals. The data acquired in this manner already allow a coarse calculation of the remaining operating lifetime in that for every violation of a threshold value or maximum value a set amount is subtracted from the predefined operating lifetime. With a continuous determination of the sensor signals which is analogous to a time profile of the signals it is possible, due to the simultaneously measured lengths of the time segments, to make a very accurate calculation of the remaining operating lifetime.

The arrangement of at least one sensor inside the housing of the weighing cell thus makes is possible to determine the current condition of the weighing cell and, in the case that several violations of the threshold value have occurred, to also calculate the remaining operating lifetime. In this specification, each movement of a parameter from a "normal" range defined by a threshold value into an "abnormal" range that is beyond the threshold value (in either a positive or negative direction), is referred to as a "threshold excursion" of that parameter. Each threshold excursion is characterized by a magnitude that is defined as a time integral of the absolute value of the difference between the parameter value and the threshold value from a time of onset until the parameter value re-crosses the threshold value into the "normal" range. In making this determination, the sensor signal determined by the sensor is compared in the computing unit to at least one threshold value, and if the threshold value is exceeded:

a corresponding threshold excursion of the weighing cell is registered;

a corresponding threshold excursion is registered and the accumulated sum of all threshold excursions is calculated; or a corresponding threshold excursion is registered and the accumulated sum of all threshold excursions is calculated, and by comparison with a maximum value for the permissible threshold excursions, a permissible remaining threshold excursion or a remaining operating lifetime is calculated.

The sum of the threshold excursions or the remaining operating lifetime can either be requested from the computing unit through the data output device, or the computing unit automatically transmits this information in the form of output signals to the data output device every time a threshold-exceeding threshold excursion is registered. This output signal can trigger different actions such as an alarm or a calibration, and/or interrupt the measuring process of the force-measuring device.

In principle, it is irrelevant at what location in the housing the sensor is installed. It can be arranged on the inside of the weighing cell housing or at the weighing cell itself, or it can also be integrated for example in the circuit board of the signal-processing electronics. It is even conceivable to arrange the sensor at the outside of the weighing cell housing, if a suitable connection exists between the interior space and the sensor which allows a corresponding parameter of the atmospheric climate of the interior space to be determined with sufficient accuracy. A temperature sensor can for example be attached to the outside of the housing if the sensor-contact surface of the housing provides a sufficient level of heat convection from the interior space to the sensor. Pressure sensors can likewise be attached to the outside of the housing if a suitable connection to the interior space is established or if the housing has at least a portion that is configured as a diaphragm, so that the atmospheric pressure in the interior space can be determined based on the deformation of the diaphragm.

In a particularly preferred embodiment, the sum of all threshold excursions sustained by the force-measuring cell is determined by integrating:

the entire time profile of the sensor signals of the at least one sensor or the time profile of the sensor signals of the at least one sensor after a threshold value has been exceeded, or the time segments during which the sensor signals of the at least one sensor lie above the one or more threshold values, and after the maximum value has been exceeded, by transmitting the condition of the force-measuring cell or, more specifically, the overstepping of the maximum value to the data output device.

The sensor signal delivered to the data output device or the output signal of the computing unit can trigger different actions such as an alarm, for example through a warning system or a reporting system, and/or it can interrupt a measuring process of the force-measuring device. It is also conceivable to turn off an operating-status indication which indicates that the force-measuring device is ready to operate.

In a further developed embodiment, the at least one sensor signal or the output signal can also trigger an automatic calibration cycle of the force-measuring cell or it can request a manual calibration to be performed by the user or the manufacturer.

In a preferred further development of the method, to monitor the at least one sensor, the sensor signals transmitted by the sensor to the computing unit are checked at least periodically in the computing unit by comparing them to verification values and verification tolerance values that are stored in the computing unit or generated by the computing unit, and an error is registered and transmitted to the data output device if a violation of the verification values and/or verification tolerance values has been found. The verification values are dependent on the sensor being used and are in most cases furnished by the manufacturer of the sensor. If for example during operation of the force-measuring device a sensor signal is delivered by the sensor which based on the physical conditions is not plausible, this is detected through the verification of the sensor signals in the computing unit. Furthermore, the verification values and verification tolerance values can also be set and/or adapted on the basis of preceding sensor signals or by means of the sensor signals of further sensors.

In a particularly preferred embodiment, at least one sensor signal is determined prior to the delivery of the force-measuring device; this sensor signal is evaluated in the computing unit and stored as a reference value, and at least following delivery of the force-measuring cell at least one sensor signal is determined by the same sensor that determined the reference value, this newly determined sensor signal is expressed as a sensor measurement value and the latter is compared to the reference value. This procedure can serve to check whether or not an unauthorized opening of the force-measuring device took place.

To carry out the method of the foregoing description, a force-measuring device is required with at least one housing which has an interior space, with at least one force-measuring cell installed in the interior space, and with at least one sensor arranged in the interior space of the housing and or with at least one sensor arranged at the housing. The at least one sensor includes a trigger element, with at least one threshold value and/or at least one operating value being represented in the trigger element, said threshold and/or operating value being dependent on at least one parameter of the atmospheric climate of the interior space which affects the operating lifetime of the force-measuring cell. Instead of the sensor with the trigger element, the force-measuring device can also have at least one sensor and at least one computing unit and/or a data output unit containing the data output device, and/or a measurement converter as well as an operating program that executes the triggering function, wherein the operating program includes at least one threshold value and/or at least one operating limit value that depend on at least one parameter of the atmospheric climate of the interior space which affects the operating lifetime of the force-measuring cell, and/or wherein at least one sequence of commands exists in the operating program for requesting the at least one threshold value and/or an operating limit value and/or a maximum value from a memory storage module. The combination of a sensor with trigger element and a computing unit with operating program is, of course, also possible.

With preference a sensor signal triggered by the trigger element is transmitted to a computing unit and/or to a data output device. The trigger element itself can be designed in different ways. It is conceivable for example to use a quartz-crystal-based humidity sensor as disclosed in WO 2004/104567 A1, whose hygroscopic layer is designed in such a way that the sensor is triggered at the precise moment when the relative humidity reaches the threshold value. Thus, the threshold is represented through the design of the hygroscopic layer in the sensor. Of course, the trigger element can also be configured as an analog circuit by means of electronic components such as comparator elements, or as a digital circuit with a microprocessor.

An output signal of the computing unit which is triggered by the operating program can also be transmitted to a data output device and/or to a further computing unit. If the computing unit of the force-measuring device and/or a data output unit containing the data output device and/or a measuring converter that is in connection with the sensor is equipped with a microprocessor, it is possible that individual, several, or all method steps of the method are implemented in an operating program, with the operating program being stored in at least one memory storage unit which is at least part of the time connected to the force-measuring device.

In one embodiment, the operating program of the foregoing description does not necessarily have to be stored in the processor but can also be recalled from a storage unit outside of the force-measuring device and uploaded to the appropriate processor.

In one embodiment, the computing unit and/or a data output unit containing the data output device is connected to the at least one sensor through either a wired or wireless connection.

In an advantageous embodiment, at least one sensor is of a type in which a storage module and/or a measurement converter is integrated.

As a sensor one can use for example a humidity sensor for which the parameter to be detected is the humidity change in the interior space which occurs when there is a leak in the housing and/or by means of which sensor a sensor signal representing the humidity parameter is determined periodically and/or randomly or continuously.

As a sensor one can also use a temperature sensor for which the parameter to be detected is the temperature change occurring in the interior space due to an exposure of the housing to a radiation and/or due to an internally caused warm-up, and/or by means of which sensor a sensor signal representing the temperature parameter is determined periodically and/or randomly or continuously.

To name a further possibility, a pressure sensor could be used for which the parameter to be detected is the pressure change occurring in the interior space due to a leak in the housing, a deformation of the housing and/or a temperature rise of the interior space, and/or by means of which sensor a sensor signal representing the pressure parameter is determined periodically and/or randomly or continuously.

Although the sensors will commonly make a quantitative measure of a parameter, some sensors useful in the embodiments will be qualitative in nature. As an example, in an embodiment where the interior space is filled with an inert gas, a sensor that qualitatively detects the presence of a non-inert gas, such as oxygen or chlorine, will provide valuable information as to the status of the force-measuring cell.

In addition to the at least one sensor, the force-measuring device can have a further sensor in the interior space of the housing or at the housing, serving to detect line voltage peaks in a current source that supplies the force-measuring cell.

Furthermore, in addition to the at least one sensor, there can be at least one further sensor arranged in the interior space of the housing or at the housing, serving to detect radioactive radiation and/or sound waves and/or shocks.

The force-measuring device can in addition to the at least one sensor include a further sensor for detecting a sensor signal dependent on the load cycles of the force-measuring cell.

However, instead of using an additional sensor, the mechanical threshold excursions can also be determined directly in the computing unit from the weighing signal of the force-measuring cell.

The sensors of the force-measuring device can be configured in such a way that a memory storage module and/or a measurement converter and/or a transmitter is integrated in each sensor.

BRIEF DESCRIPTION OF THE DRAWINGS

Details of the method and of the force-measuring device that provide these advantages will be understood from the description of the examples of embodiments that are shown in the drawings, wherein.

DETAILED DESCRIPTION OF A PREFERRED EMBODIMENT

Figure 1:
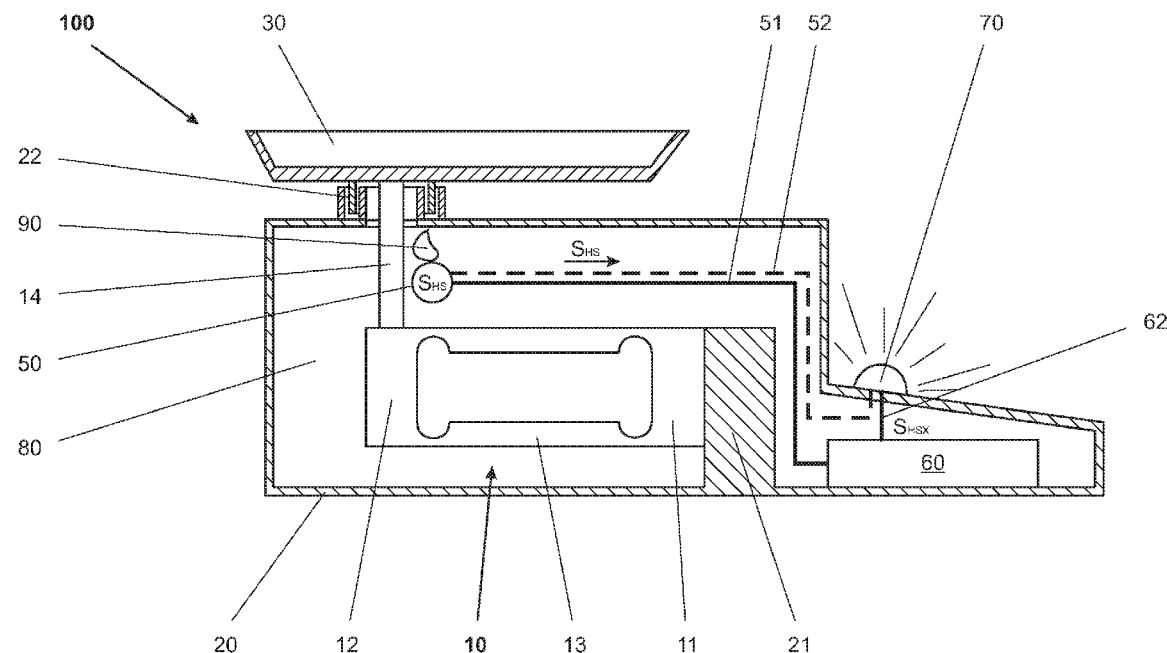
FIG. 1 is a schematic sectional view of a force-measuring device in the form of a balance with a housing that has an interior space and with a force-measuring cell arranged in the housing, wherein the interior space contains at least one sensor serving to carry out the method.

FIG. 1 gives a schematic representation of a force-measuring device, specifically a balance, shown in a sectional view. A force-measuring cell 10 has a stationary part 11 and a load-receiving part 12 which are connected to each other through an intermediate part 13. The force-measuring cell 10, which is arranged in the interior space 80 of a housing 20, is rigidly connected by its stationary part 11, through the stationary support 21, to the housing 20. A load-receiver 30 in the form of a weighing pan which is arranged outside of the housing 20 is connected by way of a force-transmitting rod 14 to the load-receiving part 12 of the force-measuring cell 10 which is arranged in the interior space 80. The force-transmitting rod 14 traverses the housing 20 without touching the latter, extending though a passage opening 22 of the housing 20. The passage opening 22 of the housing is configured in such a way that the penetration of dirt, dust and humidity is avoided as much as possible or at least strongly reduced.

Depending on the application, the interior space 80 can for this purpose also have a higher pressure in comparison to the ambient environment of the force-measuring device 100. Furthermore, at least one sensor 50 is arranged in the interior space to detect at least one parameter 90 of the atmospheric climate of the interior space and to determine a corresponding sensor signal $S_{HS}$. The sensor signal $S_{HS}$ is directed for further processing to a computing unit 60 by way of a computing-unit connection 51 and/or through a data output connection 52 to a data output device 70. The computing unit 60 is connected to the data output device 70 through the computing-unit-to-output connection 62 and transmits to the data output device 70 the output signals $S_{HSX}$ generated by the computing unit 60. The data output device 70 can be arranged either directly on the outside of the housing 20, or in separation from the housing 20, or also inside the housing 20, if the configuration of the housing 20 (sound-permeable, transparent) is such that the output can be seen or heard from the outside. Symbols or alarms that are specially tailored to the message or warning to be communicated can enhance its perception by a person. As an example, it is conceivable to use generally known pictograms such as for example the known road traffic signs or symbols that have been created especially for the intended warning. By varying the frequency of blinking visual output means or also by varying the loudness and pitch of acoustical output means, it is possible to indicate different levels of importance of the warning or message. Each of the connections 51, 52, 62 in the embodiment of FIG. 1 can be either a cable connection such as a signal cable, a bus system and the like, or a wireless connection.

As soon as there is change in a parameter 90 of the atmospheric climate of the interior space, in this example the relative humidity, or if the permissible value defined by the manufacturer is exceeded, a sensor signal $S_{HS}$ or an output signal $S_{HSX}$ is transmitted to the data output device 70, where it is appropriately announced. This can be in the form of sounding an alarm, activating an optical indication such as a blinking light, or presenting a warning or information message on a display.

Figure 2:
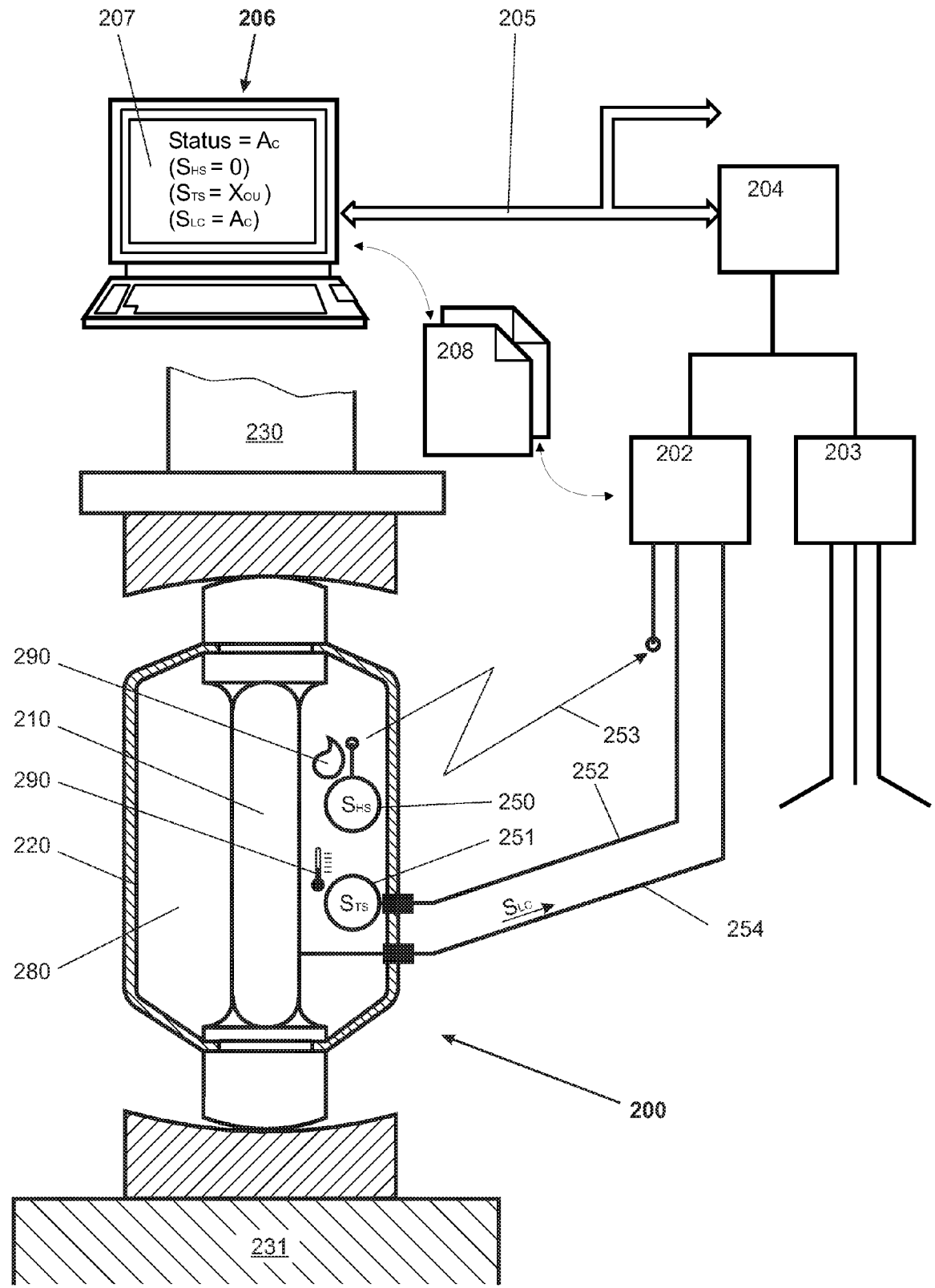
FIG. 2 is a schematic sectional view of a force-measuring device in the form of a tank load weighing module with a housing that has an interior space and with a force-measuring cell arranged in the housing, wherein the interior space contains at least two sensors that serve to carry out the method and are connected to a data output unit which is arranged outside of the housing.

FIG. 2 shows a force-measuring device 200 in the form of a tank-load-weighing module that is monitored in accordance with the inventive method. Tank-load-weighing modules are used in particular in industrial installations that serve to weigh the contents of tubs, tanks, reactor vessels and the like. Normally, a plurality of weighing modules for each container to be weighed are arranged between the feet of the container 230 and the foundation base 231. Thus, each foot of the container stands on a force-measuring device 200. In order to determine the weight of the container and/or of the contents of the latter, the weighing signals $S_{LC}$ generated by the force-measuring devices 200 have to be added together as they represent weighing signals $S_{LC}$ for partial masses. The force-measuring devices 200 in the form of weighing modules therefore normally have no data output device. The weighing signals $S_{LC}$ of the individual force-measuring devices 200 of a container are for example transmitted to a computing unit 206 in the form of a master computer, where the signals $S_{LC}$ are evaluated and presented on the data output device 207 that is integrated in the master computer, in most cases as part of a synoptic system display.

The force-measuring device 200 includes a force-measuring cell 210 which is enclosed by a housing 220. As a rule, the housing 220 is welded to the force-measuring cell 210 and closed off tightly against the ambient environment of the force-measuring device 200. In performing a measurement, the force-measuring cell 210 as well as the housing 220 are subjected to an elastic compression. The effect that the stiffness of the housing has on the weighing signal $S_{LC}$ can be partially compensated, and the hysteresis of the weighing module is negligible in relation to the measuring range. The parameters of the atmospheric climate 290 of the interior space are detected and/or measured by means of sensors 250, 251. The sensors 250, 251 are connected to a computing unit 206 by way of connecting lines 252 and/or wireless connections 253, transmitters 202, measuring converters 203, a segment coupler 204, and a bus system 205. The weighing signal $S_{LC}$ of the force-measuring cell 210 can be transmitted to the computing unit 206 either through these connections or through its own weighing signal connection 254.

The force-measuring device 200 in FIG. 2 has a temperature sensor 251 and a humidity sensor 250 in the interior space of the housing 280. The sensors 250, 251, which are operable independently of each other, are transmitting measurement values to the computing unit 206 which correspond to the parameters of the atmospheric climate 290 of the interior space. The computing unit 206 in FIG. 2 is for example the master computer of a process control system. Depending on the configuration of the force-measuring device 200 and the computing unit 206, the sensors 250, 251 automatically transmit their respective sensor signals $S_{HS}$, $S_{TS}$ to the computing unit 206 either continuously or periodically and/or randomly, or after a change has occurred. Of course, it is also possible that the computing unit 206 calls up the sensor signals $S_{HS}$, $S_{TS}$ from the sensors 250, 251 continuously, periodically or based on a random principle. The temperature sensor 251 has transmitted a sensor signal $S_{TS}$ which is compared in the computing unit 206 to the upper operating limit value $T_{uou}$ and the lower operating limit value $T_{LOU}$. In the present example and also as shown in FIG. 4, the sensor signal $S_{TS}$ lies within the operating bandwidth $T_B$ und thus inside the operating window ($S_{TS}=X_{OU}$).

The humidity sensor 250 has registered no change of the parameter of the atmospheric climate 290 of the interior space ($S_{HS}=0$) that would indicate a leak in the housing. On the other hand, the analysis of the weighing signal $S_{LC}$ showed that the force-measuring cell 210 was overloaded during a short time period and that the force-measuring device 200 needs to be recalibrated. Since a plurality of force-measuring devices 200 are used for one container, the sensor signals $S_{TS}$, $S_{HS}$ of one force-measuring device 200 can be verified with the help of the respective sensor signals $S_{TS}$, $S_{HS}$ of the other force-measuring devices 200 of the same container. However, the values for the verification can also be stored already in the sensor 250, 251 or in the computing unit 206. The values for the verification are taken in part from published tables whose values come from other instruments or from internet data. Thus, data that apply to the specific place where the force-measuring device is being used, such as for example the ranges of pressure, temperature and radiation, or data about seismic vibrations, are known and can be used for the verification of the sensor signals. If a part of the sensor signals $S_{TS}$, $S_{HS}$ can be stored in the computing unit 206 in the sense of collecting a history, the analysis of the history can serve to provide additional knowledge about the condition of the force-measuring cell 210 as well as the sensors 251, 252. The verification values and the tolerance values for the verification are dependent on the sensor being used and are in most cases provided with the delivery of the sensor by the manufacturer. If during the operation of the force-measuring device for example a sensor signal $S_{TS}$, $S_{HS}$ is delivered by the sensor which is incompatible with the current physical conditions, this is detected from the verification of the sensor signals $S_{TS}$, $S_{HS}$ in the computing unit 206. Furthermore, the verification values and the tolerance values for the verification can also be set and/or adapted with the help of previous sensor signals $S_{TS}$, $S_{HS}$ or by means of the sensor signals $S_{TS}$, $S_{HS}$ of further sensors.

For humidity sensors, temperature sensors, shock sensors, current converters, voltage converters and the like one can use any of the known state-of-the-art sensors that are capable of producing a sensor signal corresponding to the change or magnitude of the measurement quantity to be determined.

The method according to the invention can be performed by means of centralized and/or decentralized parts of a control device of a system, for example with the computing unit 206 and/or the measurement converters or transmitters 202, 203, which are for this purpose equipped with the appropriate operating programs 208. The status of the sensors 250 can be displayed for example only on the data output device 207 of the computing unit 206 or on the measurement converters or transmitters 202, 203. However, it is also possible to split the task between the different levels of the process control system. With appropriate measures, the method according to the invention can thus be implemented inexpensively on single- or multi-level systems of any kind. Measurement converters and transmitters 202, 203 can also be installed in a mobile instrument through which the individual values of the sensors 250, 251 can be interrogated by way of wireless connections 253. The individual sensors 250, 251 need to have an identification code for this purpose, which is known and used in many state-of-the-art applications.

Figure 3A:
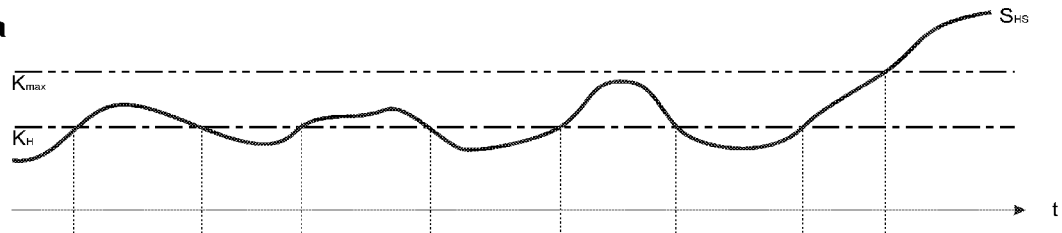
FIGS. 3a through 3c are graphical presentations of the time profile of the signal of a humidity sensor arranged in the interior space of the housing, with FIG. 3a showing the signal profile, FIG. 3b showing the cumulative sum of the threshold excursions, and FIG. 3c showing the output signals or output messages generated by the signal profile.

FIG. 3 shows the time graph of the relative humidity based on the continuously detected sensor signals $S_{HS}$ of the sensor 50 from the example of FIG. 1, as well as the output signals or output messages $A_C$, $A_M$, $A_D$ generated from the sensor signals $S_{HS}$. As seen in FIG. 3a, the signal curve for the sensor rises above a threshold value $K_H$ at the times $t_1, t_3, t_5, t_8$. This threshold value represents a limit value which, when exceeded, corresponds to a humidity concentration that is so large that it has an effect on the weighing signal due to corrosion in parts of the force-measuring cell 10 or the signal-processing circuitry and leads to a gradual destruction of the force-measuring cell 10. The magnitude of the threshold value $K_H$ depends on the one hand on the materials in the interior space 80 of the force-measuring device 100 and on the other hand on the aggressiveness of the medium that penetrates to the inside and has to be defined on a case-by-case basis by the manufacturer. The threshold values can for example be defined as follows:

| | |
|---|---|
| Vibration limits: | 0.196133 m/s² |
| Min./max. storage temperature limits | −20° C. to 70° C. |
| Line voltage peaks | |
| (disturbance or destruction | |
| of electrical components) | |
| Load cycles (fatigue limits). | |

As soon as the signal returns below the threshold value $K_H$ as shown for the times $t_2, t_4, t_7$, the condition is stabilized and the destruction in the interior space 80 of the force measuring device 100 does not advance further. As shown in FIG. 3c, when the signal returns below the threshold value $K_H$, a calibration $A_C$ can be requested through the data output device, or a calibration can be initiated automatically.

Furthermore, one can additionally define a maximum value $K_{max}$ for example in such a way that when the latter is exceeded the force-measuring cell 10 and the electronic components are destroyed within a very short time.

Figure 3B:
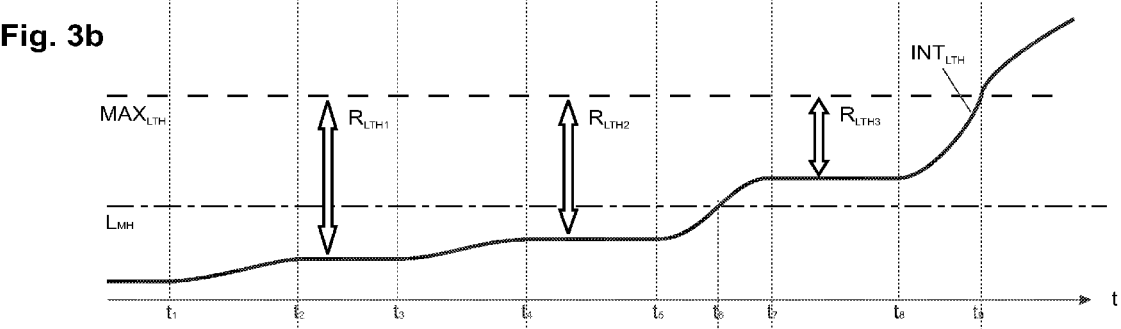
Figure 3C:
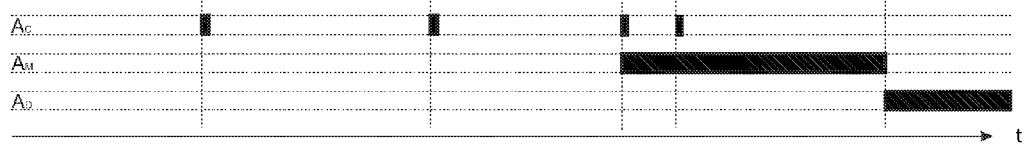

The excursions of the signal past the threshold value $K_H$ and the maximum value $K_{max}$ with their associated time lengths ($t_2-t_1; t_4-t_3; t_7-t_5; \ldots$) are registered and cumulatively added as threshold excursions $INT_{LTH}$ as shown in FIG. 3b. The cumulative sums $INT_{LTH}$ of the threshold excursions are compared to the operating lifetime limit value $MAX_{LTH}$ and from the result of the comparison the remaining operating lifetime $R_{LTH1}, R_{LTH2}, R_{LTH3}$ is calculated. The latter is transmitted to the data output device 70 or stored in the computing unit.

As illustrated in FIG. 3b, it is possible to define further limit values. An example that could be named is the servicing limit value $L_{MH}$ which, when exceeded, will cause a warning message and/or a service request $A_M$ to be directed to the data output device 70 (see FIG. 3c). Furthermore, when the servicing limit value $L_{MH}$ is exceeded at the time $t_6$, it is possible to use this as a signal for example to block the function of the force-measuring cell, to downgrade the accuracy class of the balance, to add warning messages to printouts of the measurement values, and/or to inform the manufacturer automatically through an internet connection. This enumeration is not meant to be complete, as many other possible actions and forms of output could be named in this context.

As soon as the threshold excursions $INT_{LTH}$ exceed the lifetime limit value $MAX_{LTH}$, a signal value $A_D$ representing this condition as shown in FIG. 3c is transmitted to the data output device to indicate the probably irreversible internal destruction of the force-measuring device. Logically, the signal value $A_D$ also blocks the function of the output device so that the continued use of the force-measuring device is prevented.

Figure 4A:
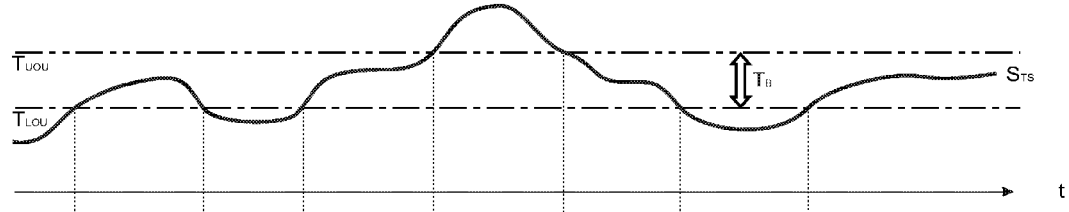
FIGS. 4a and 4b are graphical presentations of the time profile of the signal of a temperature sensor arranged in the interior space of the housing, with FIG. 4a showing the signal profile and FIG. 4b showing the output signals or output messages generated by the signal profile.
Figure 4B:

FIG. 4 shows a time graph of the temperature based on the continuously detected sensor signals $S_{TS}$ of a temperature sensor that is arranged in the interior space of the housing, as well as the output signals or output messages $A_C$, $X_{OU}$ generated in the computing unit based on the sensor signals $S_{TS}$. As seen in FIG. 4a, the temperature profile falls in some parts below a lower operating limit value $T_{LOU}$ and rises in other parts above an upper operating limit value $T_{uou}$. In contrast to the time graph of the relative humidity shown in FIG. 3, a violation of the limit values $T_{LOU}$ and $T_{uou}$ in the present example does not lead to the destruction of the force-measuring cell. The checking for a violation of the limit values takes place either in the computing unit or in the sensor itself. As soon as the sensor signals $S_{TS}$ are within the bandwidth $T_B$ defined by the operation limit values, for example a corresponding signal $S_{TS}=X_{OU}$ as shown in FIG. 4b is transmitted to the data output device. Depending on the configuration, this signal can also actuate a switch that releases the weighing process so that the weighing with the force-measuring cell is enabled. Furthermore, at the return of the temperature profile curve into the defined bandwidth $T_B$, a calibration $A_C$ can be either automatically initiated or requested from the user.

Figure 5A:
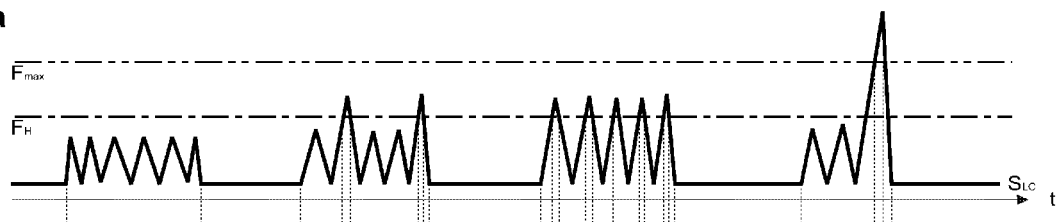
FIGS. 5a through 5c are graphical presentations of the time profile of the weighing signal of the force-measuring cell, with FIG. 5a showing the signal profile, FIG. 5b showing the cumulative sum of the threshold excursions, and FIG. 5c showing the output signals or output messages generated by the signal profile.

FIG. 5 shows the time graph of the mechanical threshold excursion of the force-measuring cell based on the continuously detected sensor signals $S_{LC}$, as well as the output signals or output messages $A_C$, $A_M$, $A_D$ generated from the sensor signals $S_{LC}$. As seen in FIG. 5a, the weighing signal curve rises several times above a threshold value $F_H$. This threshold value represents a limit value which, when exceeded, corresponds to a mechanical load of such magnitude that the weighing signal $S_{LC}$ will be affected due to plastic deformations of parts of the measuring cell and that the force-measuring cell 10 will be gradually destroyed. The magnitude of the threshold value $F_H$ depends on the materials used in the force-measuring cell 10 and needs to be specified by the manufacturer on a case-by-case basis.

If the weighing signal $S_{LC}$ is below the threshold value $F_H$, the stress levels in the materials remain in the elastic range which is non-destructive for the force-measuring cell. As shown in FIG. 5c, when the threshold value $F_H$ is exceeded, a calibration $A_C$ can be requested through the data output device, or a calibration can be initiated automatically.

Furthermore, one can additionally define a maximum value $F_{max}$ in such a way that when the latter is exceeded it can be assumed that the force-measuring cell 10 will be destroyed by a correspondingly high mechanical load.

Figure 5B:
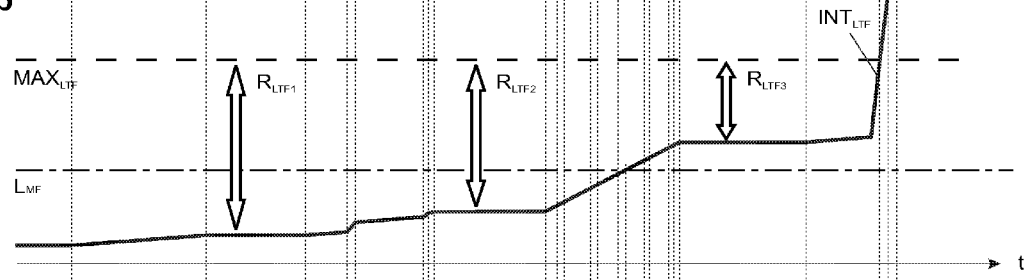
Figure 5C:
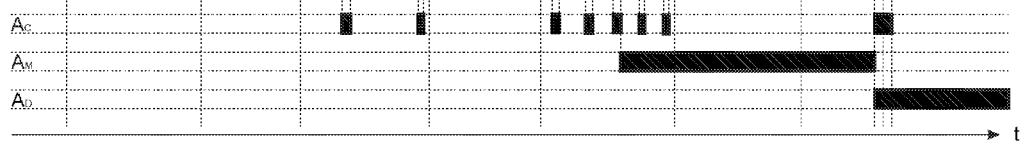

The excursions of the signal past the threshold value $F_H$ and the maximum value $F_{max}$ are registered and cumulatively added as threshold excursions $INT_{LTF}$ as shown in FIG. 5b. The cumulative sums $INT_{LTF}$ of the threshold excursions are compared to the operating lifetime limit value $MAX_{LTF}$ which has been determined by experiments, and from the result of the comparison the remaining operating lifetime $R_{LTF1}, R_{LTF2}, R_{LTF3}$ is calculated. The latter is transmitted to the data output device 70 or stored in the computing unit.

As illustrated in FIG. 5b, it is possible to define further limit values. An example that could be named is the servicing limit value $L_{MF}$ which, when exceeded, will cause a warning message and/or a service request $A_M$ to be directed to the data output device 70 (see FIG. 5c). Furthermore, when the servicing limit value $L_{MF}$ is exceeded, it is possible as described in the context of FIG. 3b to use this as a signal for example to block the function of the force-measuring cell, to downgrade the accuracy class of the balance, to add warning messages to printouts of the measurement values, and/or to inform the manufacturer automatically through an internet connection.

As soon as the threshold excursions $INT_{LTF}$ exceed the lifetime limit value $MAX_{LTF}$, a signal value $A_D$ representing this condition as shown in FIG. 5c is transmitted to the data output device to indicate the probably irreversible internal destruction of the force-measuring device. It makes sense, that the signal value $A_D$ also blocks the function of the data output device so that the continued use of the force-measuring device is prevented.

The disclosed embodiments have further advantages which relate only indirectly to the determination of the condition and the calculation of the operating lifetime. In hermetically encapsulated force-measuring devices one can even ascertain, for example by a comparison of the sensor signals of an installed humidity sensor at the time of delivery and after the installation at the customer's premises, whether or not the force-measuring device was opened during transportation. This aspect is of high importance particularly for force-measuring devices that are subject to official verification and represents an additional assurance measure besides the official seal.

It is further possible that suitable sensor signals generated by the at least one sensor are also used for the correction of the measurement result in order to avoid the installation of additional measuring sensors of the kind that are used for example in state-or-the-art equipment for the compensation of hysteresis and/or drift phenomena.

From the examples of embodiments presented in the foregoing description, one should not conclude that the present invention is limited to the arrangement of only one measuring cell in only one housing. It is within the scope of ordinary professional knowledge to apply the invention likewise in arrangements that encompass at least two weighing cells in a housing. Furthermore, the coordination between measurements and warnings is of no concern in regard to the subject of the invention. Messages/warnings in real time as well as messages/warnings that are offset in time relative to the measurements are possible within the scope of the invention.

What is claimed is:

1. A force-measuring device, comprising:
   a housing with an interior space;
   a force-measuring cell installed in the interior space, which is characterized by an atmospheric climate having a first parameter which influences an operating lifetime of the force-measuring cell;
   a sensor arranged either in the interior space or at the housing, the sensor further comprising a trigger element; and
   a means for monitoring and determining sensor data, arranged in cooperative relationship with the sensor, comprising:
   a computing unit;
   an operating program; and
   a storage module containing a threshold value that is dependent on the first parameter;
   wherein the sensor transmits a first sensor signal, based on a measurement of the first parameter, to the sensor data monitoring and determining means, where the computing unit stores and compares the first sensor signal to the threshold value and, if the threshold value is exceeded, a threshold excursion is registered.

2. An arrangement for monitoring and/or determining the condition of a force-measuring device with a housing having an interior space and a force-measuring cell installed in the interior space, wherein the interior space has an atmospheric climate that influences an operating lifetime and/or a weighing signal of the force-measuring cell, the arrangement comprising:
   a sensor arranged in the interior space or at the housing, the sensor comprising a means for measuring a parameter of the atmospheric climate and a means for transmitting a sensor signal corresponding to the measured parameter;
   a means for receiving and analyzing the sensor signal, comprising:
   a module for storing measured values of the parameter and a predetermined threshold value for the parameter: and
   an operating program for calculating an estimate of remaining operating lifetime of the force-measuring cell from the stored values; and
   a means for triggering corrective action when the value of the measured parameter goes beyond a predetermined threshold value, the triggering means associated with either the sensor or the receiving and analyzing means.

3. The arrangement of claim 2, wherein:
   the receiving and analyzing means is selected from the group consisting of a computing unit, a data output unit, a data output device and a measurement converter.

4. A method for monitoring and/or determining the condition of a force-measuring device with a housing having an interior space with a force-measuring cell installed therein, the interior space further having an atmospheric climate that influences an operating lifetime and/or a weighing signal of the force-measuring cell, the method comprising the steps of:
   measuring a first parameter of the atmospheric climate with a sensor arranged in the interior space or at the housing;
   transmitting a first sensor signal corresponding to the measured first parameter from the sensor to a computing unit, a data output device or both; and
   using the first sensor signal to calculate and maintain an estimate of remaining operating lifetime of the force-measuring cell, from stored measurements of the first parameter.

5. The method of claim 4, further comprising the steps of:
   measuring the first parameter, the second parameter or both parameters at more than one predetermined time with the sensor, the additional sensor or both sensors;
   comparing the parameters measured at more than one predetermined time in order to determine a change in the first parameter, the second parameter or both parameters; and
   determining at least one sensor signal corresponding to the change in the first parameter, the second parameter, or both parameters.

6. The method of claim 4, further comprising the steps of:
   monitoring the sensor by checking at least one of the transmitted sensor signals in the computing unit at least periodically and by comparing the sensor signal to a verification value, a verification tolerance value or both, the values being stored in the computing unit, and
   registering and transmitting an error to the data output device when a deviation from any of the values has been found.

7. The method of claim 4, wherein at least one of the transmitted sensor signals or the output signal of the computing unit initiates at least one of the following steps:
   triggering an alarm;

interrupting a measuring process; and turning off a "ready-to-operate" indication.

8. The method of claim 7, wherein at least one of the transmitted sensor signals or the output signal of the computing unit initiates at least one of the following steps:

initiating an automatic calibration cycle of the force-measuring cell, and requesting a manually executed calibration from the user/manufacturer.

9. The method of claim 4, further comprising the steps of:

comparing at least one of the determined sensor signals in the computing unit to at least one threshold value; and if the threshold is exceeded:

registering a corresponding threshold excursion;

registering a corresponding threshold excursion and calculating the sum of all threshold excursions; or registering a corresponding threshold excursion and calculating the accumulated sum of all threshold excursions, and calculating a permissible remaining threshold excursion or a remaining operating lifetime by comparison with a maximum value for the permissible threshold excursions.

10. The method of claim 9, further comprising the steps of:

determining the sum of all threshold excursions having an effect on the force-measuring device through integrating:

a) the entire time profile of the sensor signals; or b) the time profile of the sensor signals after a threshold value has been exceeded; or c) the time segments during which the sensor signals lie above at least one of the threshold values; and transmitting the condition of the force-measuring device to the data output device after the maximum value is exceeded.

11. The method of claim 10, wherein at least one of the transmitted sensor signals or the output signal of the computing unit initiates at least one of the following steps:

initiating an automatic calibration cycle of the force-measuring cell, and requesting a manually executed calibration from the user/manufacturer.

12. The method of claim 4, further comprising the steps of:

measuring a second parameter of the atmospheric climate with the sensor or with an additional sensor, wherein the second parameter influences the weighing signal of the force-measuring cell and may be the same as the first parameter, comparing a sensor signal corresponding to the first parameter, the second parameter or both in the computing unit to an upper operating limit value, a lower operating limit value or to both operating limit value;

transmitting the first sensor signal, the second sensor signal or both or an output signal of the computing unit to a data output device when one of the operating limits is found to be violated.

13. The method of claim 12, wherein:

the measuring steps occur continuously, periodically, randomly or periodically and randomly.

14. The method of claim 13, further comprising the steps of:

measuring the first parameter, the second parameter or both parameters at more than one predetermined time with the sensor, the additional sensor or both sensors;

comparing the parameters measured at more than one predetermined time in order to determine a change in the first parameter, the second parameter or both parameters; and determining at least one sensor signal corresponding to the change in the first parameter, the second parameter of both parameters.

15. The method of claim 14, further comprising the steps of:

comparing at least one of the determined sensor signals in the computing unit to at least one threshold value; and, if the threshold is exceeded:

registering a corresponding threshold excursion; or registering a corresponding threshold excursion and calculating the sum of all threshold excursions; or registering a corresponding threshold excursion and calculating the accumulated sum of all threshold excursions, and calculating a permissible remaining threshold excursion or a remaining operating lifetime by comparison with a maximum value for the permissible threshold excursions.

16. The method of claim 15, further comprising the steps of:

determining the sum of all threshold excursions having an effect on the force-measuring device through integrating:

a) the entire time profile of the sensor signals; or b) the time profile of the sensor signals after a threshold value has been exceeded, or c) the time segments during which the sensor signals lie beyond at least one of the threshold values; and transmitting the condition of the force-measuring device to the data output device after the maximum value is exceeded.

17. The method of claim 16, wherein at least one of the transmitted sensor signals or the output signal of the computing unit initiates at least one of the following steps:

triggering an alarm;

interrupting a measuring process; and turning off a "ready-to-operate" indication.

18. The method of claim 17, wherein at least one of the transmitted sensor signals or the output signal of the computing unit initiates at least one of the following steps:

initiating an automatic calibration cycle of the force-measuring cell; and requesting a manually executed calibration from the user/manufacturer.

19. The method of claim 18, further comprising the steps of:

monitoring the sensor by checking at least one of the transmitted sensor signals in the computing unit at least periodically and by comparing the sensor signal to a verification value, a verification tolerance value or both, the values being stored in the computing unit; and registering and transmitting an error to the data output device when a deviation from any of the values has been found.

20. The method of claim 19, further comprising the steps of:

determining at least one of the sensor signals prior to delivery of the force-measuring device is delivered;

storing the sensor signal in the computing unit as a reference value;

determining an actual sensor signal again after delivery of the force-measuring cell with the same sensor used to determine the reference value; and comparing the actual sensor signal to the reference value.

* * * * *